H. G. MORDAUNT.
FILM WINDING DEVICE FOR CAMERAS.
APPLICATION FILED FEB. 16, 1917.
1,253,078.
Patented Jan. 8, 1918.
2 SHEETS—SHEET 1.
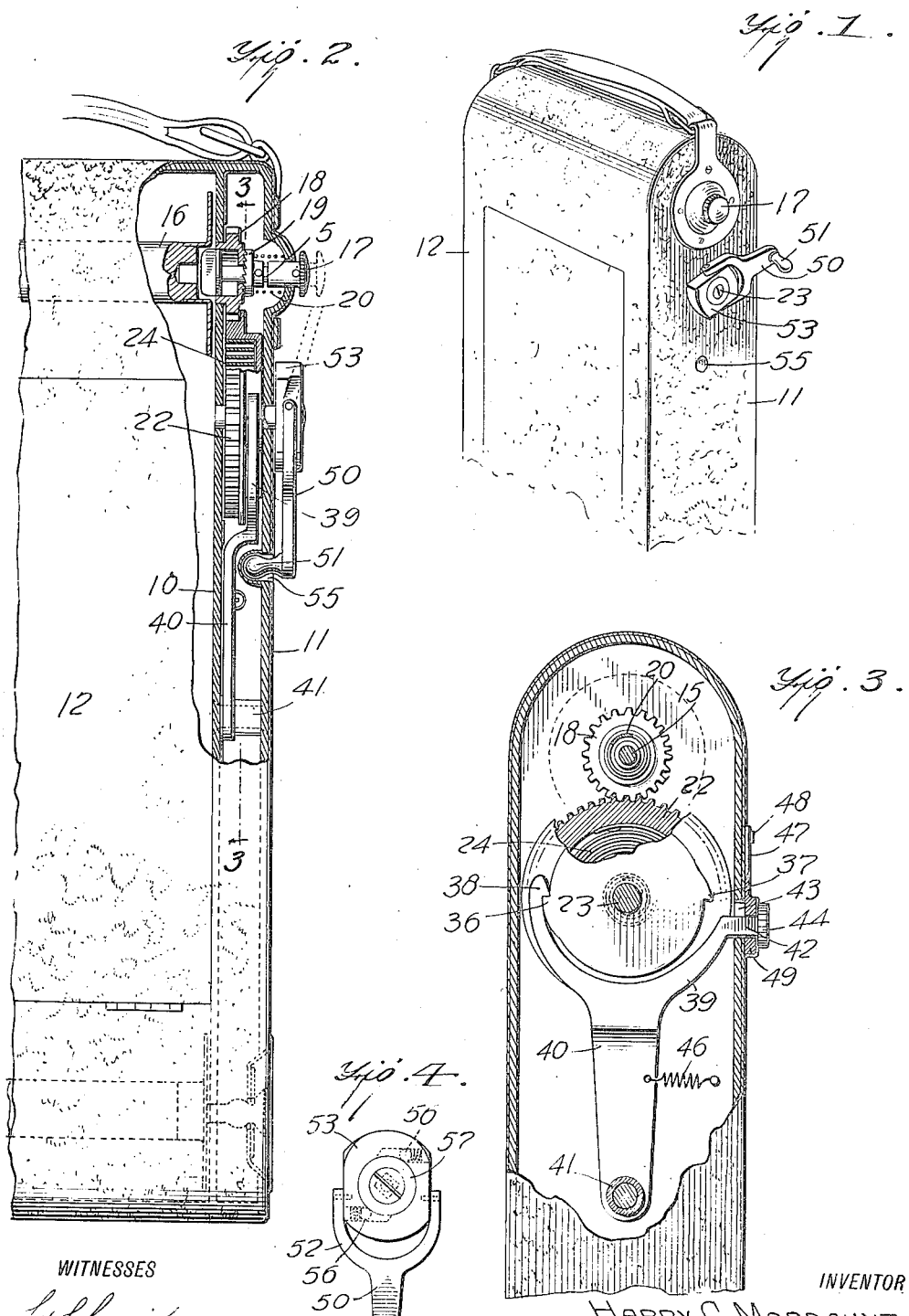

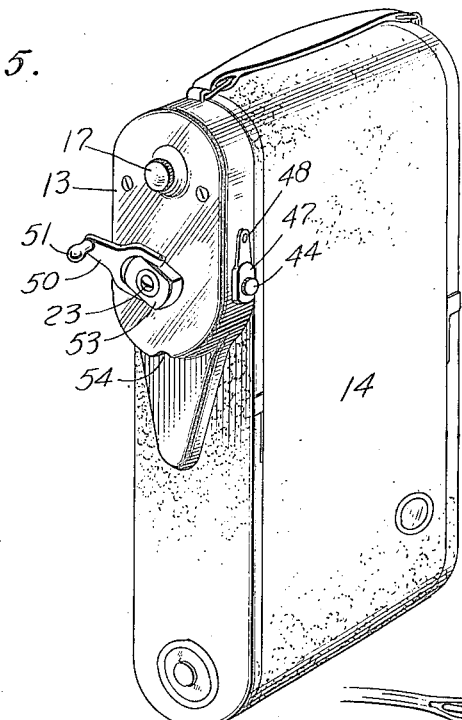
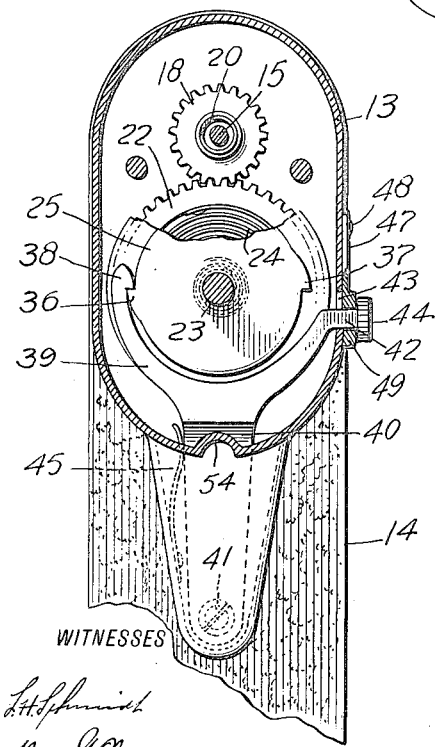
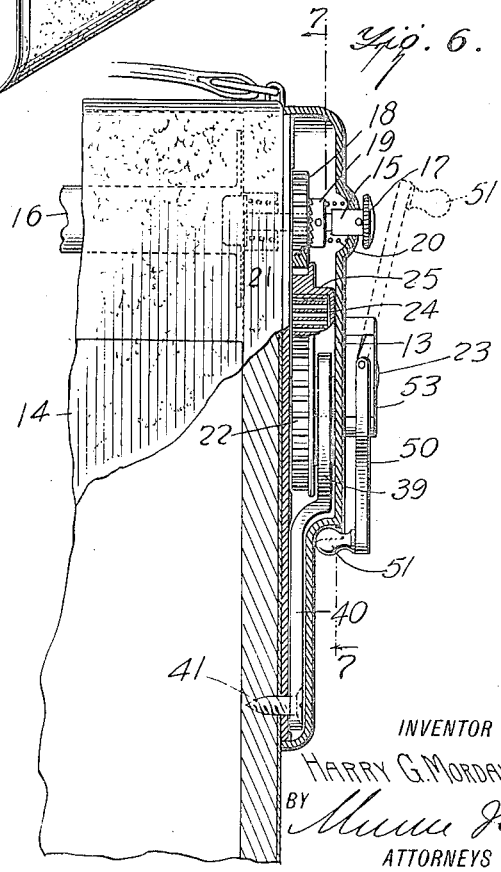

UNITED STATES PATENT OFFICE.

HARRY G. MORDAUNT, OF SALT LAKE CITY, UTAH.

FILM-WINDING DEVICE FOR CAMERAS.

1,253,078.   Specification of Letters Patent.   Patented Jan. 8, 1918.

Application filed February 16, 1917. Serial No. 149,046.

*To all whom it may concern:*

Be it known that I, HARRY G. MORDAUNT, a citizen of the United States, and a resident of Salt Lake City, in the county of Salt Lake and State of Utah, have invented a certain new and useful Improvement in Film-Winding Devices for Cameras, of which the following is a specification.

My present invention relates generally to cameras, and more particularly to film winding devices therefor, my object being to provide a neat, compact, and inexpensive apparatus which may be utilized either as an attachment for cameras now in use, or as a part of a complete camera in the first instance, my present construction being an improvement upon the construction shown and described in my application, filed January 24, 1917, Serial Number 144,276.

The primary object of my present improvement is to simplify the construction shown in my application above referred to, and bring about equally effective results with an inexpensive compact apparatus, and without the necessity of attachment to the film for the purpose.

Other objects relating for the most part to the details of construction of my present improvement, will be better understood from the following description, reference being made to the accompanying drawings forming a part of this specification, and wherein—

Figure 1 is a perspective view of a portion of a camera containing my improvements as a part thereof;

Fig. 2 is a front elevation of a portion thereof, partially broken away and in section;

Fig. 3 is a sectional view therethrough taken substantially on the line 3—3 of Fig. 2;

Fig. 4 is a detail elevation of the spring winding parts removed;

Fig. 5 is a detail perspective view of a camera in connection with which my improvements have been mounted as an attachment;

Fig. 6 is a front elevation of a portion thereof, partially broken away and in section, and Fig. 7 is a sectional view taken substantially on line 7—7 of Fig. 6.

Referring now to these figures, and particularly to Figs. 1 to 3 inclusive, wherein my invention is contained within the camera as manufactured, the camera has inner and outer parallel walls 10 and 11 at one side, forming a space therebetween for the full length of the camera, in which my improvements are, for the major portion, housed, the casing of the camera being generally indicated at 12.

Where, on the other hand, my improvements are utilized as an attachment, as seen in Figs. 5 to 7, they are mounted within a supplemental casing 13 secured to one side of the casing 14 of the camera adjacent the upper end thereof.

The shaft 15 of the take-up roll 16 is in either instance extended beyond the outer wall, that is the outer wall of the supplemental casing 13, in Figs. 5 to 7, and the outer wall 11 of the camera in Figs. 1 to 3, and has an external knurled head 17, by means of which it may be manually rotated and engaged and disengaged from the take-up roll 16.

In either form of the invention, the shaft 15 of the take-up roll 16 is provided with a loose gear 18 having a clutch face at one side for engagement by a clutch member 19, secured upon said shaft 17, a spring 20 serving to normally hold the clutch faces together, either with or without the assistance of the inner spring 21 of the take-up shaft, as seen in Fig. 6.

The gear 18 is in mesh with a lower enlarged gear 22, the latter being mounted upon a shaft 23 and actuated by a spring 24 within a housing 25, the inner end of which spring is secured to the shaft 23, so that by rotating the latter the spring may be wound.

The gear 22 is preferably formed integral with the housing 25, and the latter provided at one side of the said gear with diametrically opposed lugs 36 and 37, as clearly seen by reference to Figs. 3 and 7, each of which is engageable by means of a hook 38 at one side of the upper arcuate end 39 of a controlling lever 40, the lower end of which is pivotally supported by a pivot 41, and the upper end of which has an extension 42 opposite the hook 38 and projecting laterally and exteriorly through an opening 43, the said extension having an external finger piece 44 at the rear of the camera casing.

Normally the hook 38 is in engagement with one of the lugs 36 and 37 of the gear 22, to lock the film winding parts against movement, it being necessary to press the finger piece 44 inwardly in order to shift the hook 38 out of engaged position, and thus permit of rotation of the gear 22 under actuation of the spring 24, releasing movement of the controlling lever 40 being against the tension of a spring, for instance, a leaf spring 45, as shown in Fig. 7, or a coiled spring 46, as shown in Fig. 3.

With the parts shown in Figs. 3 and 7, inward movement of push button 44 will release hook 38 from lug 36 to permit of movement of the gear 22, which movement rocks the controlling lever 40 on its pivot 41 of course, and shifts the opposite side of its arcuate end 39 into the path of movement of the lug 37, so that in the rotation of the gear 22, lug 37 will engage the adjacent portion of the arcuate end 39, and assist the spring, spring 45 in one instance, and spring 46 in the other instance, to return the lever 40 so that its hook 38 will be in the path of movement of the lug 37 for engagement with the latter when the gear has made a half turn, such movement being sufficient to rotate the take-up shaft 15 and consequently the take-up roll 16, through gear 18 and clutch 19, the desired number of times.

Accidental inward pressure upon the finger-piece 44 is prevented by a latch 47, pivotally mounted at 48, and the slotted end 49 of which is movable to partly embrace the extension 42 of lever 40, beneath its finger piece 44.

The shaft 23 may, in either form of the invention, be rotated to rewind the spring 24 when necessary, by means of an external lever 50, having an outer crank 51 and an inner yoke 52, the latter of which is pivotally connected to opposite sides of a clutch piece 53, as best seen in Figs. 1, 4, and 5, the pivotal connection of yoke 52 permitting the lever 50 to be moved from its operative position, shown in Figs. 1 and 5, to the inoperative position thereof shown in full lines in Figs. 2 and 6, wherein the crank 51 is received in a depression, for instance, a depression 54 in the supplemental casing 13, or a depresion 55 in the outer wall 11. The clutch piece 53 carries internal friction clutch members 56, operating against the periphery of a disk 57, the latter of which is secured to the outer end of the shaft 23, so that the lever 50 not only operates to rotate the shaft in order to wind the spring 24, but reverse rotation of said shaft is prevented when the said lever is in the inoperative position as described.

It is obvious from the foregoing that my present improvement provides for a simple, compact, and inexpensive arrangement, by which the film may be automatically advanced upon release of the lever hook 38 under actuation of the push button 44; a construction neat in appearance, and comparatively inexpensive in its nature, which will avoid material addition to the camera in weight and bulk, and which will be effective and efficient at all times for the purposes stated.

It is furthermore obvious by a comparison of the two forms of the invention shown, that my improvements are susceptible of utilization as an attachment in connection with a camera now in use, as they are of construction as a part of a camera in the first instance, and that my improvements operate with equal facility in both forms.

I claim:

1. In a camera, the combination with the shaft of the take-up roll, of a mechanism for rotating said shaft including a pair of intermeshing gears, one of which is mounted on the shaft, a spring operating the other gear, a lever normally holding said latter gear inoperative and pivoted at one end, said lever having its opposite end curved and provided with engaging means at one side, and a projecting finger-piece at the opposite side, said gear having projecting lugs normally engaged and held by the said engaging means of the lever.

2. In a camera, the combination with the shaft of the take-up roll, of a mechanism for rotating said shaft, including a pair of intermeshing gears, cne of which is mounted upon, and has a ratchet connection with, the said shaft, the other of said gears having projecting lugs, a spring operating the latter gear, a lever controlling rotation of the gear, and pivoted at one end, the opposite end of said lever being arcuately curved and having an engaging hook at one side, the opposite side of the curved end of said lever having a projecting finger-piece and being movable into the path of movement of the said lugs when the lever is shifted to release the gear.

3. In a camera, the combination with the shaft of the take-up roll, of a gear having a ratchet connection with the said shaft, a spring actuated gear in connection with said shaft gear, and provided with projecting lugs, and a spring controlled lever pivoted at its lower end beneath said spring actuated gear and having an arcuately curved upper end provided at one side with a hook for engagement with the lugs of the said gear, and at its opposite side with a projecting finger piece, for the purpose described.

4. In a film winding mechanism, a spring actuated winding member having geared connection with the take-up shaft, and provided with diametrically opposed projecting lugs, a lever pivoted at its lower end below said member and having an upper arcuately curved end provided at one side with a hook normally in engagement with one of the said lugs, the opposite side of the curved end of said lever having a projecting finger-piece and being movable into the path of movement of the lugs when the lever is shifted by its finger-piece to released position.

HARRY G. MORDAUNT.